UNITED STATES PATENT OFFICE.

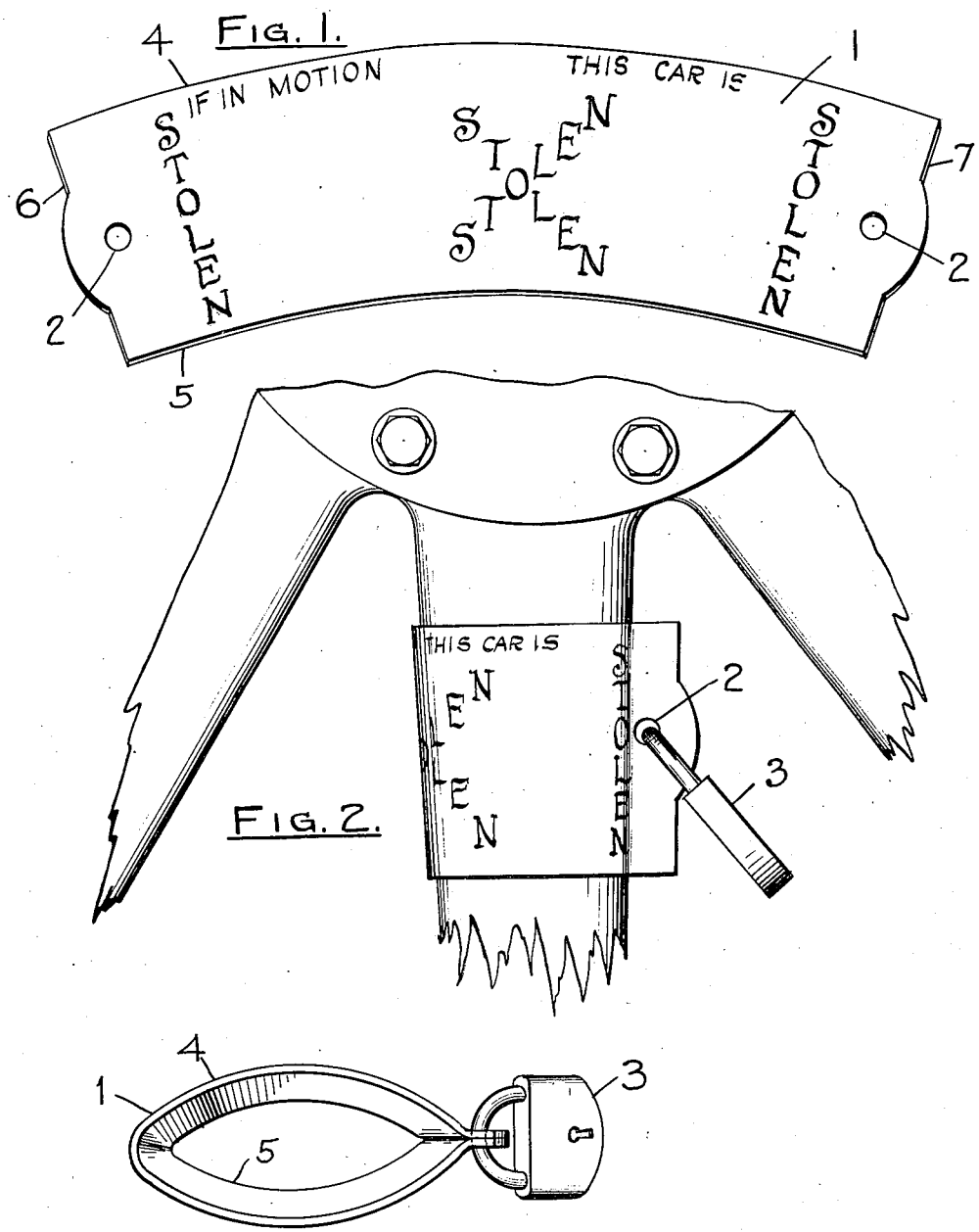

EDWARD S. GRACE, OF NEW YORK, N. Y.

AUTOMOBILE THEFT-INDICATING DEVICE.

1,342,044.  Specification of Letters Patent.  Patented June 1, 1920.

Application filed October 20, 1919. Serial No. 331,785.

*To all whom it may concern:*

Be it known that I, EDWARD S. GRACE, a citizen of the United States of America, residing at city, county, and State of New York, have invented new and useful Improvements in Automobile Theft-Indicating Devices, of which the following is a specification.

My invention has for its object the provision of means for indicating the theft of an automobile or other vehicle comprising a device adapted to be attached to the vehicle by the operator when leaving it which shall indicate that the vehicle has been stolen if it is in motion with the device attached. It is a further object to provide a device for this purpose which may be attached to a spoke of a wheel of the vehicle.

A further object is the provision of means for this purpose which shall attract the attention of both the eye and the ear of persons whom the stolen car may pass. Still a further object is to make such means plainly visible and capable of attracting attention when the vehicle is in motion.

With these objects in mind, and such others as are apparent from this specification, my invention consists in the construction, combination and arrangement of parts herein illustrated, described and claimed.

In the accompanying drawings, in which similar reference characters designate corresponding parts in all views, I have illustrated a preferred embodiment of my invention, and in these drawings:

Figure 1 shows a blank for an indicator, stamped and ready for bending to shape;

Fig. 2 shows the indicator in place upon a spoke of a wheel; and,

Fig. 3 is a plan view of the indicator shown in Fig. 2.

In its preferred form as shown, my indicating device consists of a strip 1 preferably of tough sheet metal which may be stamped out and provided with holes 2 near each end, and a sufficient distance apart to permit of the indicator 1 being bent around the spoke of a wheel and held thereon by means of a padlock 3 passing through the holes 2.

I prefer to make the indicator of a strip of metal with its long edges 4 and 5 curved and concentric when the metal is flat, the ends 6 and 7 tapering toward the center of the circles of which the long sides 4, 5 are arcs. Due to this shape, when the strip 1 is bent around a spoke and padlock, the shape of the indicator substantially corresponds with that of the tapered spoke; and the long edge 4 is preferably made of such length that the indicator can slide to the innermost end of the spoke, the length of the side 5 being such that the taper of the indicator when bent to shape corresponds with the taper of the spoke.

The material of which this indicator 1 is made should be of such toughness that it cannot be cut by the usual metal cutting shears, which might be carried by a thief; and the strip further is preferably made to fit the spoke closely enough so that such an instrument could not be inserted between the indicator and the spoke.

Due to this construction the indicator is free to slide upon the spoke, and will therefore assume a position when the vehicle is in motion, dependent either upon the force of gravity or upon centrifugal force, or upon the resultant of these two forces, or will move under these influences.

In order that the indicator may slide freely upon the spoke the blank is preferably stamped out from the back, as shown in Fig. 1, thus turning the edges slightly, and presenting a slight bevel on the interior toward the spoke.

Upon the strip 1 are suitable indications to the effect that if the car is in motion, it is a stolen car. The strip itself 1, and the legend, are preferably in bright colors, for instance red, so as to be readily visible and to attract attention.

In use, this device is placed upon a spoke 8 of a wheel of the vehicle, preferably the right forward wheel, which will normally be that most readily visible as the vehicle stands at the curb, or as it approaches, the ends 6 and 7 of the strip being brought together around the spoke, and the padlock 3 being passed through the holes 2 and snapped in place.

In case the vehicle is stolen and driven with the indicator in place, this indicator will attract the attention of the people passed by the vehicle, first because of its bright color, and second because of its motion, which as the vehicle first picks up speed, will be up and down along the spoke, according to the relative effect of the forces of gravity and of centrifugal force acting upon it; and later, when the vehicle has acquired considerable speed, the indicator will be held at the outer end of the spoke against the felly of the wheel by centrifugal force and in whirling around rapidly will make a noticeable streak that will attract the attention of passersby. When suitable publicity has been given to the device, so that it is recognized by the average person in the street, it will give a clear indication of the fact that the vehicle has been stolen, and suitable measures can be taken to apprehend the thief.

The owner of the vehicle, who has the key to the padlock 3, before entering the vehicle after he has left it, unlocks the padlock 3, and detaches the indicator 1, which may be carried in any suitable pocket of the vehicle.

Having now described my invention, I claim and desire to secure by United States Letters Patent:

1. A device to prevent the stealing of vehicles comprising a strip of metal formed and arranged to be slidably clamped to a spoke of a wheel, said strip bearing indications of theft, and means for locking said strip to prevent its removal.

2. A device to prevent the stealing of vehicles comprising a strip of metal formed and arranged to slidably encompass a spoke of a wheel, said strip bearing indications of theft, and a padlock for securing together the ends of said strip.

3. A device to prevent the stealing of vehicles comprising a strip of metal bent to encompass a spoke of a wheel, the edges of said strip being turned outwardly from such spoke, said strip having holes near each end, and a padlock adapted to pass through said holes and secure together the ends of said strip.

4. A device to prevent the stealing of vehicles comprising a strip of metal bearing indications of theft, and means to hold said strip upon a spoke slidable thereon under the influence of gravity and centrifugal force.

5. A device to prevent the stealing of vehicles comprising indicating means, and means for supporting such indicating means on the vehicle such that it will tend to assume a position under the action of gravity, and other positions under the action of centrifugal force, whereby reciprocatory and rotary motion are imparted to the indicator to attract attention.

In testimony whereof I have signed my name to this specification.

EDWARD S. GRACE.